UNITED STATES PATENT OFFICE.

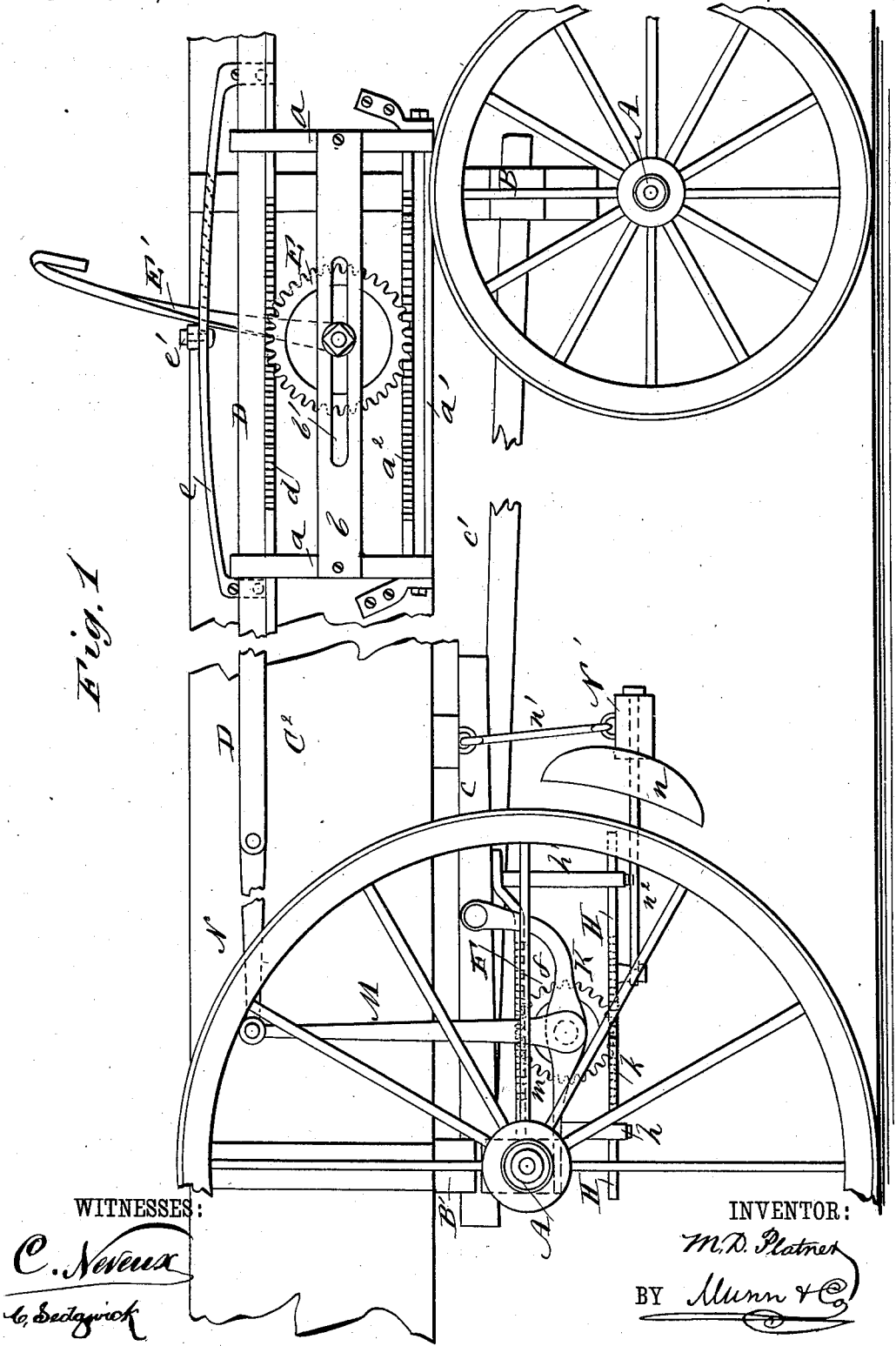

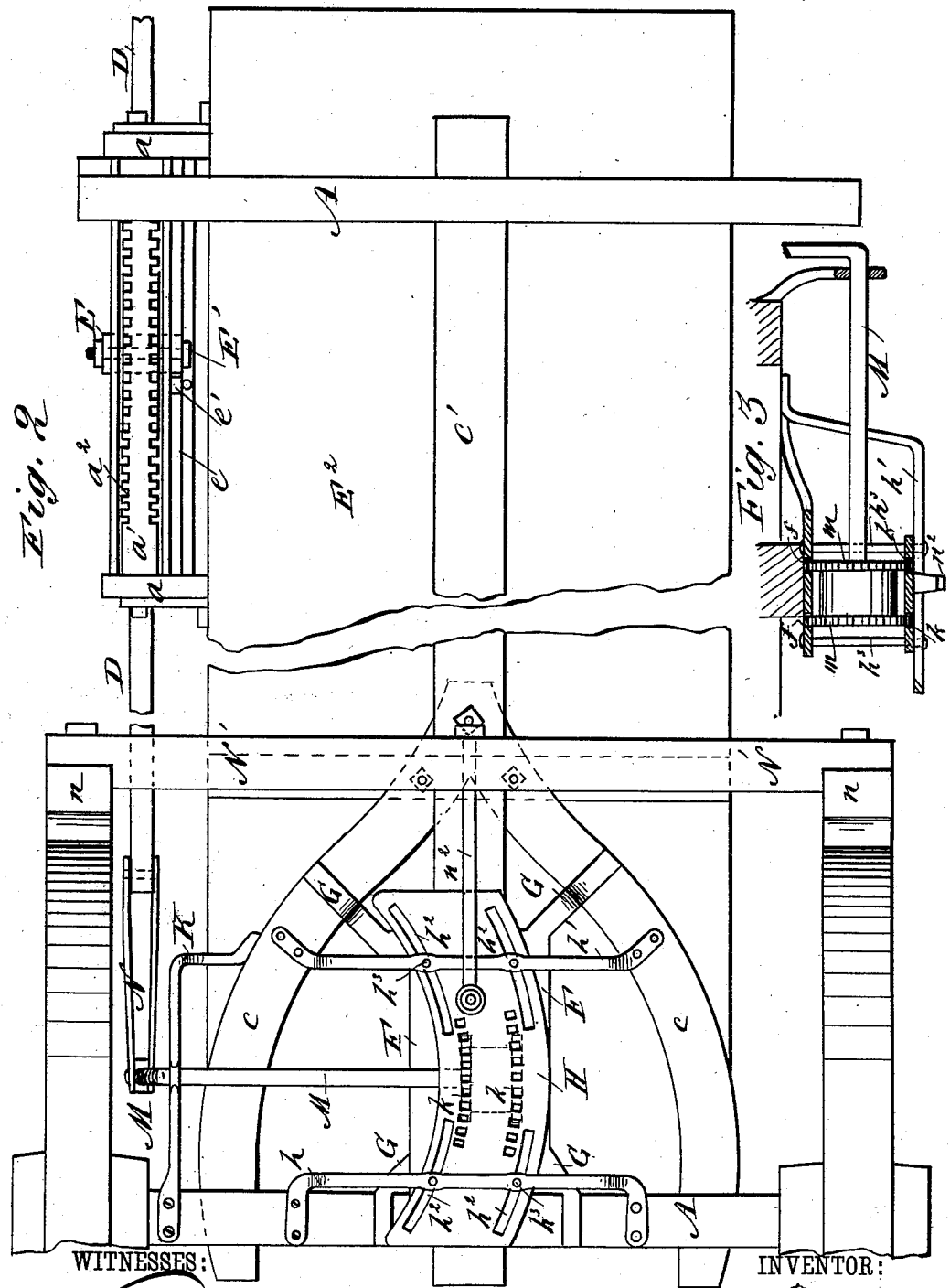

MARSHAL D. PLATNER, OF VIRGINIA CITY, MONTANA TERRITORY.

VEHICLE-BRAKE.

SPECIFICATION forming part of Letters Patent No. 374,002, dated November 29, 1887.

Application filed June 7, 1887. Serial No. 240,523. (No model.)

*To all whom it may concern:*

Be it known that I, MARSHAL D. PLATNER, of Virginia City, in the county of Madison, Montana Territory, have invented a new and Improved Wagon-Brake, of which the following is a full, clear, and exact description.

My invention relates to an improvement in wagon-brakes, and has for its object to provide a brake more conveniently operated than usual, and which need be moved but a slight distance to bring the shoes in contact with the wheels, and wherein, further, the said shoes may be normally positioned a much greater distance from the wheels than in the ordinary form of brake.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a side elevation of a wagon, partially broken away, and Fig. 2 is a bottom plan view of the same. Fig. 3 is a central vertical section through the fixed and sliding plates and pinion in Fig. 2.

In carrying out the invention, A represents the axle; B B', the forward and rear bolsters; C, the rear hounds; C', the reach, and C$^2$ the wagon-body.

To the right-hand side of the body, at the front, a double frame, $a$, is attached, the lower longitudinal bar, $a'$, of said frame being provided with teeth integral with its upper edge, the teeth upon one side registering with the teeth upon the other, as shown in Fig. 2, whereby a fixed rack, $a^2$, is produced.

Above the fixed rack $a^2$ two parallel plates, $b$, are secured to the uprights of the frame, provided with aligning central and longitudinal slots, $b'$, as shown in Fig. 1, and upon suitable bearings in the upper portion of the frame-standards a bar, D, is adapted to slide, carrying a rack, $d$, upon the under face thereof, similar in construction to the aforesaid fixed rack $a^2$, the said sliding bar D being adapted to extend beyond the frame at each end.

In the slots $b'$ of the plates $b$ a pinion, E, is journaled to slide therein, the said pinion being of such a diameter as to simultaneously engage the teeth of the fixed rack $a^2$ and the sliding rack $d$. The pinion E is operated by a lever, E', attached to the inner trunnion, which lever is adapted to extend upward within a yoke, $e$, attached to the wagon-body above the frame $a$, where said lever normally assumes a perpendicular position, resting against a stop, $e'$, integral with said yoke, which limits the rearward movement of the lever. The yoke is also provided with a series of notches, (illustrated in dotted lines, Fig. 1,) whereby the lever E', which is a foot-lever, may be retained in a locked or semi-locked position.

Beneath the reach, at the rear, a plate, F, is held horizontally in suspension by means of brackets G, attached to or integral with the plate and secured to the hounds and axles, as shown in Fig. 2, the said plate being provided centrally with a double semicircular row of spaced and aligning rectangular apertures, $f$.

Beneath the fixed plate F a segmental plate, H, is held to slide in more or less U or yoke shaped brackets $h$ $h'$, one bracket, $h$, being attached transversely the wagon to the under side of the rear axle, and the other bracket, $h'$, to the hounds parallel with said axle and in the same horizontal plane with the bracket $h$.

The sliding plate H is provided at each end with two concentric slots, $h^2$, through which bolts $h^3$ are projected, which bolts, adapted to guide the plate H in its reciprocating movement, are secured at one end to the plate F and at their other end to the brackets $h$ and $h'$, respectively. The plate H is centrally provided with a double semicircular row of rectangular aligning apertures $k$, which apertures are in substantially the same vertical plane with the apertures $f$ in the fixed plate F.

To the right of the running-gear, at the rear, a horizontal bar, K, is attached to the side of the hounds, and also to the under side of the rear axle, in which bar a crank-shaft, M, is journaled, the inner end of which, projecting inward between the plates F and H, is made to carry a pinion, $m$, the said pinion being adapted to simultaneously engage the apertures in the aforesaid plates F and H.

The crank-arm of the shaft M, which extends upward outside the wagon-body, is pivotally connected with the sliding rack-carrying rod D by means of a link, N, as shown in Fig. 1.

The brake-bar N', carrying the brake-shoes n, is held to swing beneath the body by means of rods n', engaging staples attached thereto and to the wagon-frame, or in any approved manner, and the said brake-bar derives its motion from the sliding plate H through the medium of a connecting-bar, $n^2$, rigidly secured to said brake-bar at one end and pivotally attached to the under side of plate H at the other end.

When the foot-lever is in its usual position—that is, perpendicular—the brake-shoes are removed about six to eight inches from the periphery of the wheels. When it is desired to apply the brakes, the lever E' is pressed forward with the foot; but only a slight movement of the said lever is necessary, as the pinion E, acting simultaneously upon the sliding rack d and fixed rack $a^2$, and the action of the pinion m upon the fixed and sliding plates simultaneously with the aforesaid pinion and rack, and the sliding motion of the pinion E in the slots b', cause the brake-bar to be as quickly drawn in contact with the wheels as if the shoes were but two or three inches therefrom. In fact a short throw of the lever E produces, through the mediums above set forth, a lengthy throw of the sliding plate H.

It will be observed that the brake-shoes being far removed from the wheels lessens the chance of their clogging up with mud upon heavy roads, and that the lever standing in a perpendicular position renders it more conveniently and speedily operated.

Having thus described my invention, what I claim as new, and desire to secure by Letters Patent, is—

1. In a brake, the combination, with the fixed rack $a^2$, the sliding rack-carrying bar D, the pinion E, having rotary and horizontal motion and the lever E', of the apertured fixed plate F, the parallel segmental apertured sliding plate H, the angular rock-shaft M, pinion m, the brake-bar N', and connection between said rock-shaft and sliding rack-bar, substantially as shown and described.

2. In a brake, the combination, with the fixed rack $a^2$, the sliding rack-carrying bar D, the pinion E, having rotary and horizontal motion, the lever E', and retaining device e, of the apertured fixed plate F, the parallel segmental apertured sliding plate H, the rock-shaft M, carrying a pinion, m, the brake-bar N', the connecting-rod $n^2$, uniting said sliding plate and brake-bar, and the link N, connecting said rock-shaft and sliding bar D, substantially as shown and described, and for the purpose herein set forth.

3. In a brake, the combination, with the fixed rack $a^2$, the sliding rack-carrying bar D, the pinion E, having a rotary and horizontal movement, the lever E', and retaining device e, of the fixed plate F, having a double-curved row of apertures f, the parallel segmental sliding plate H, provided with a double row of aligning apertures, k, aligning the aforesaid apertures f, the rock-shaft M, carrying a pinion, m, adapted to engage the apertures f and k, the brake-bar N', a connecting-bar uniting said brake-bar and sliding plate, and a link-connection, N, between said rock-shaft and sliding bar D, all arranged to operate substantially as shown and described, and for the purpose herein set forth.

MARSHAL D. PLATNER.

Witnesses:
GEORGE F. COPE,
ALFRED E. GLOYD.